US010865908B2

(12) United States Patent
Kristynik

(10) Patent No.: US 10,865,908 B2
(45) Date of Patent: Dec. 15, 2020

(54) INDUSTRIAL PLUMBING FIXTURE ADAPTOR KIT AND METHOD

(71) Applicant: Paul D. Kristynik, Bryan, TX (US)

(72) Inventor: Paul D. Kristynik, Bryan, TX (US)

( * ) Notice: Subject to any disclaimer, the term of this patent is extended or adjusted under 35 U.S.C. 154(b) by 0 days.

(21) Appl. No.: 16/369,472

(22) Filed: Mar. 29, 2019

(65) Prior Publication Data
US 2020/0003328 A1 Jan. 2, 2020

Related U.S. Application Data

(60) Provisional application No. 62/693,104, filed on Jul. 2, 2018.

(51) Int. Cl.
*F16K 31/60* (2006.01)
*E03C 1/04* (2006.01)
(52) U.S. Cl.
CPC .............. *F16K 31/605* (2013.01); *E03C 1/04* (2013.01); *Y10T 137/6024* (2015.04)
(58) Field of Classification Search
CPC ..... F16K 31/605; Y10T 137/6024; E03C 1/04
See application file for complete search history.

(56) References Cited

U.S. PATENT DOCUMENTS

| | | | |
|---|---|---|---|
| 4,445,529 A | 5/1984 | Lagarelli | |
| 4,589,688 A * | 5/1986 | Johnson | E03C 1/0403 285/12 |
| 4,662,389 A | 5/1987 | Igbal | |
| 4,670,959 A * | 6/1987 | Rosen | B23P 15/001 29/234 |
| 4,794,945 A * | 1/1989 | Reback | F16K 31/60 137/315.12 |
| 4,842,009 A | 6/1989 | Reback | |
| 5,165,727 A * | 11/1992 | Valley | F16L 19/0231 285/12 |
| 5,259,281 A | 11/1993 | Burke | |
| 5,375,887 A * | 12/1994 | Johnson | E03C 1/021 285/12 |
| 5,467,799 A | 11/1995 | Buccicone et al. | |
| 5,519,929 A | 5/1996 | Bleckman | |
| 6,314,841 B1 | 11/2001 | Burk et al. | |
| 6,505,532 B1 | 1/2003 | Lawson | |
| 6,547,159 B1 * | 4/2003 | Westby | B05B 15/60 239/204 |
| 6,666,227 B2 | 12/2003 | Erickson | |

(Continued)

*Primary Examiner* — Kevin R Barss
(74) *Attorney, Agent, or Firm* — Suzanne Kikel, Patent Agent

(57) ABSTRACT

An industrial plumbing fixture adaptor kit for connecting a handle assembly to a water valve and a related method. The kit may be used on a variety of water valves where different spacing exists between the handle and the water valve. The kit includes an adaptor having a conical element and hollow tube. A bushing is mountable between the conical element and external threads of the adaptor, and a handle is threadably attached to the adaptor and received in the bushing for forming a handle assembly. An interchangeable adaptor element is connectable to the water valve. Several interchangeable adaptor elements are provided, each with a different length and a different configured head. The interchangeable adaptor element is affixed to a stem of the water valve and is received in the hollow tube of adaptor when the handle assembly is secured to the fixture trim.

8 Claims, 3 Drawing Sheets

(56) References Cited

U.S. PATENT DOCUMENTS

| | | | | |
|---|---|---|---|---|
| 8,333,410 | B2* | 12/2012 | Boticki | F16L 47/32 |
| | | | | 285/127.1 |
| 8,752,865 | B1* | 6/2014 | Coogle | F24F 13/222 |
| | | | | 285/12 |
| 2003/0056826 | A1* | 3/2003 | Thomas | E03C 1/122 |
| | | | | 137/360 |
| 2006/0150783 | A1 | 7/2006 | Thompson | |
| 2006/0243102 | A1 | 11/2006 | Vines | |
| 2015/0308593 | A1* | 10/2015 | Brouwer | F16L 19/0206 |
| | | | | 137/315.11 |

* cited by examiner

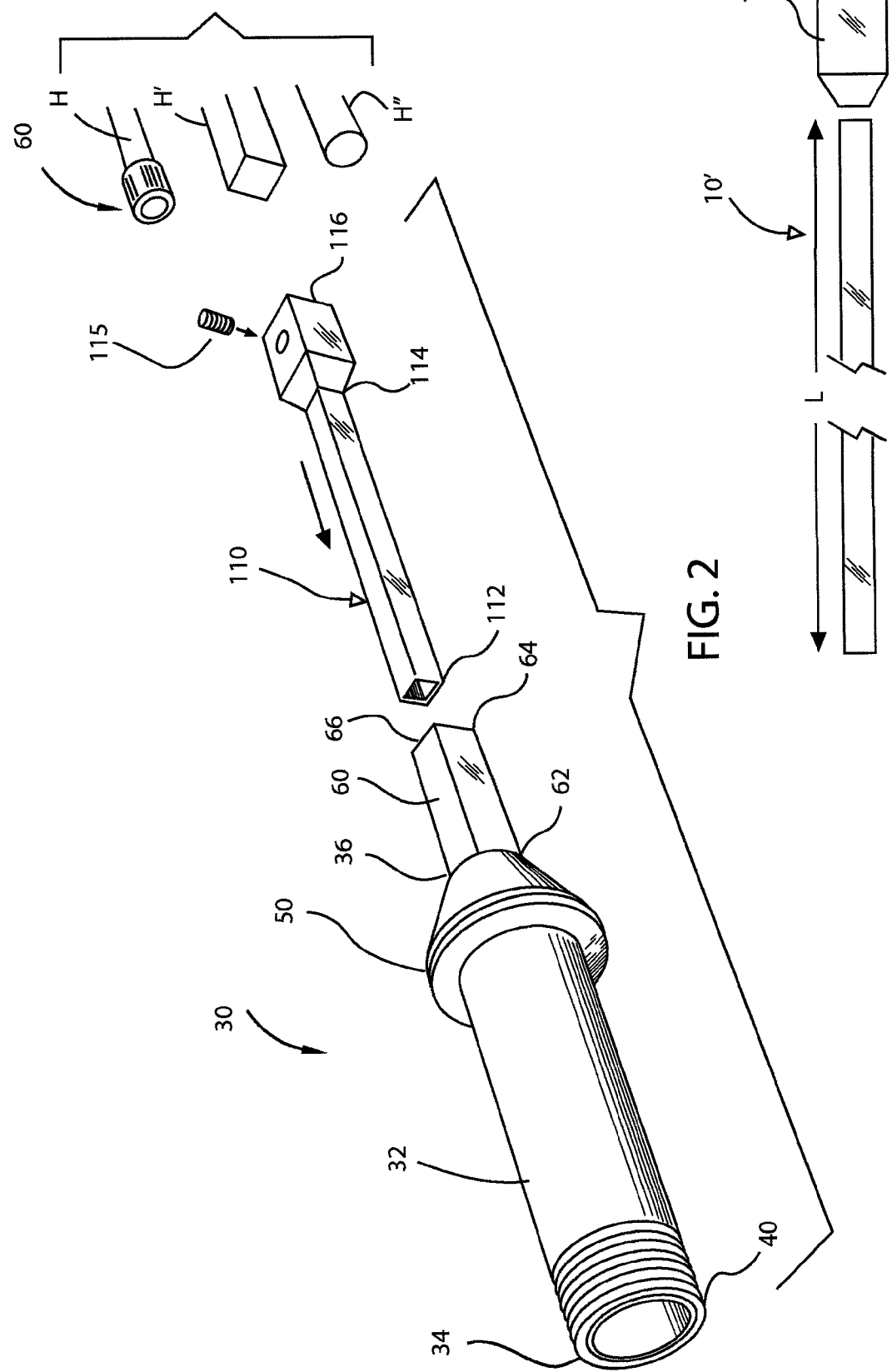

INDUSTRIAL PLUMBING FIXTURE ADAPTOR KIT AND METHOD

CROSS REFERENCE TO RELATED APPLICATIONS

This application claims priority to U.S. Provisional Patent Application Ser. No. 62/693,104 filed Jul. 2, 2018, entitled Industrial Plumbing Fixture Adaptor, the disclosure of which is incorporated herein by reference in its entirety.

BACKGROUND OF THE INVENTION

1. Field of the Invention

The present invention relates to the general art of hand tools, and to the particular field of plumbing tools and methods for using the plumbing tools.

2. Brief Description of the Prior Art

Tub and/or shower faucets are typically mounted through a wall surrounding the tub or the shower stall. The faucets are anchored against rear studs and/or to the wall board, and are linked to the water supply from behind the wall via a water valve stem that projects forward adjacent a wall opening to provide control over the water valve from the room side of the wall.

Most of these water valves are mixing valves which accept both hot and cold water; which control the proportioning and volume of water there through; and which deliver a mixed outlet stream to a tub filler or a shower head when the water valve is turned on. An example of such a mixing valve is disclosed in U.S. Pat. No. 5,467,799 issued to Dana F. Buccicone, et al. on Nov. 21, 1995 and entitled "Mixing Valve". Other such valves simply control the volume of a single supply of cold or hot water.

Such valves are typically designed such that a valve stem protrudes into the room through a hole in the room wall and a surrounding decorative escutcheon is used to effectively hide the hole in the room wall. The escutcheon also prevents leakage through the wall hole and restricts heat and cold transfer between opposite sides of the wall.

Since the thickness of the wall may vary depending on the construction material selected by the builder or the customer, the plumber or plumbing installer often makes a rough-in installation, and then corrects for the final materials. The final adjustment is often achieved by providing threads on the valve housing which the escutcheon can be tighten down on, thus providing some range of adjustment.

In instances where the wall is particularly thin or unusually thick the amount of adjustment allowed by such threads may be insufficient, thereby requiring the plumber to reposition the valve at a time when access to the valve may be restricted. This type of situation may be time consuming and may damage any construction that has already been made around the valve housing.

Several mounting assemblies have been developed in an attempt to address this problem. For example, U.S. Pat. No. 4,662,389 issued to Muhammad Ighal on May 5, 1987 entitled "Adjustable Stem Assembly" discloses a valve assembly having a valve extension which can be threaded to vary the position of the escutcheon. This mounting assembly has the disadvantage of requiring many components and separate fasteners.

U.S. Pat. No. 4,842,009 issued to Richard L. Reback on Jun. 27, 1989 entitled "Valve Handle Adaptor Kit" discloses a mounting assembly which is suitable for receiving a variety of adaptors. The length of the mounting assembly can be varied by eliminating or adding extension pieces. This mounting system requires multiple parts.

U.S. Pat. No. 4,445,529 issued to Carmen J. Lagarelli on May 1, 1984 entitled "Adjustable Valve Handle" provides a less complex assembly in which a plastic insert with internal splines is adjustably mounted along the length of a stem by a set screw. However, use of a set screw in this context may be awkward.

There is, therefore, a need in the art to provide an industrial plumbing fixture adaptor kit which permits a plumber or worker to have readily available a wide variety of valves, valve stems, and the like which can be used to install a mounting assembly in walls of various thicknesses.

There is a further need in the art to provide an industrial plumbing fixture adaptor kit and a method of using this industrial plumbing fixture adaptor kit.

SUMMARY OF THE INVENTION

The present invention provides such needs. The present invention provides an industrial plumbing fixture adaptor kit which comprises a plurality of interchangeable adaptor elements, each of which is appropriate for a particular mixing valve or valve stem and each of which has a length appropriate for the particular job being performed. The kit includes an adaptor element which will connect a selected adaptor element to a handle via a bushing which will permit the handle to be rotated to operate the valve being connected to the handle.

In the invention, the industrial plumbing fixture adaptor kit for mounting a handle to a water valve, comprises: an adaptor comprising an adaptor body having a first end with external threads and a second end; a conical element fixedly mounted on the adaptor body at a location spaced away from the first end of the adaptor body; a hollow tube fixedly attached to the second end of the adaptor body, the hollow tube being linearly aligned with the adaptor body and having a second end which is spaced away from the first end, the hollow tube being rectangular in cross section and having an opening defined in the second end; a bushing mountable on the adaptor body adjacent to the conical element, the bushing being locatable between the conical element and the external threads of the adaptor, the bushing having external threads; a first isolater washer mountable on the adaptor body adjacent to the bushing and between the bushing and the external threads of the adaptor; a handle having internal threads and adapted to be threadably attached to the external threads of the adaptor; and an interchangeable adaptor element having a portion which is rectangular in cross-section and having a first end structured to be received within the defined opening of the hollow tube and having a head which is structured to be connected to the stem of a plumbing hardware.

The kit further comprises a plurality of interchangeable adaptor elements, each having a different length relative to each other and each interchangeable adaptor element has a head for connection of the adaptor element to the plumbing hardware. The adaptor, the bushing, the first isolater washer and the handle form a handle assembly. A fixture trim has internal threads for engaging with the external threads of the bushing of the formed handled assembly for attaching the handle assembly to the fixture trim and for free rotation of the handle within the fixture trim for opening and closing of the plumbing hardware or water valve.

A vapor barrier gasket may optionally be mounted on the adaptor body against the bushing and a second washer may be mounted on the adaptor body and against the vapor barrier gasket. A set screw located adjacent to the second end of the interchangeable adaptor secures the interchangeable adaptor element to the plumbing hardware. The configuration of the head of each interchangeable adaptor element may differ relative to each other and may correspond to the configuration of the plumbing hardware.

In an embodiment of the invention, the kit includes an industrial style plumbing fixture trim made from malleable iron screw fittings that can adapt to any single handle rough-in valve body and mixing valve. The adaptor kit includes a two-part assembly where one part can be swapped out to adapt to any style stem.

The kit of the invention enables a worker to adapt to any rough-in mixing valve that is covered up inside a finished out wall without any damage to the finished wall.

These and other features and advantages of the invention will be better appreciated and understood when the following description is read in light of the accompanying drawings.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

FIG. 2 is an enlarged, exploded, perspective view of the adaptor and interchangeable adaptor element of the kit of the invention.

FIG. 3 is an enlarged, exploded, elevational view of the interchangeable adaptor element of the kit of the invention.

DETAILED DESCRIPTION OF THE INVENTION

Figure 1:
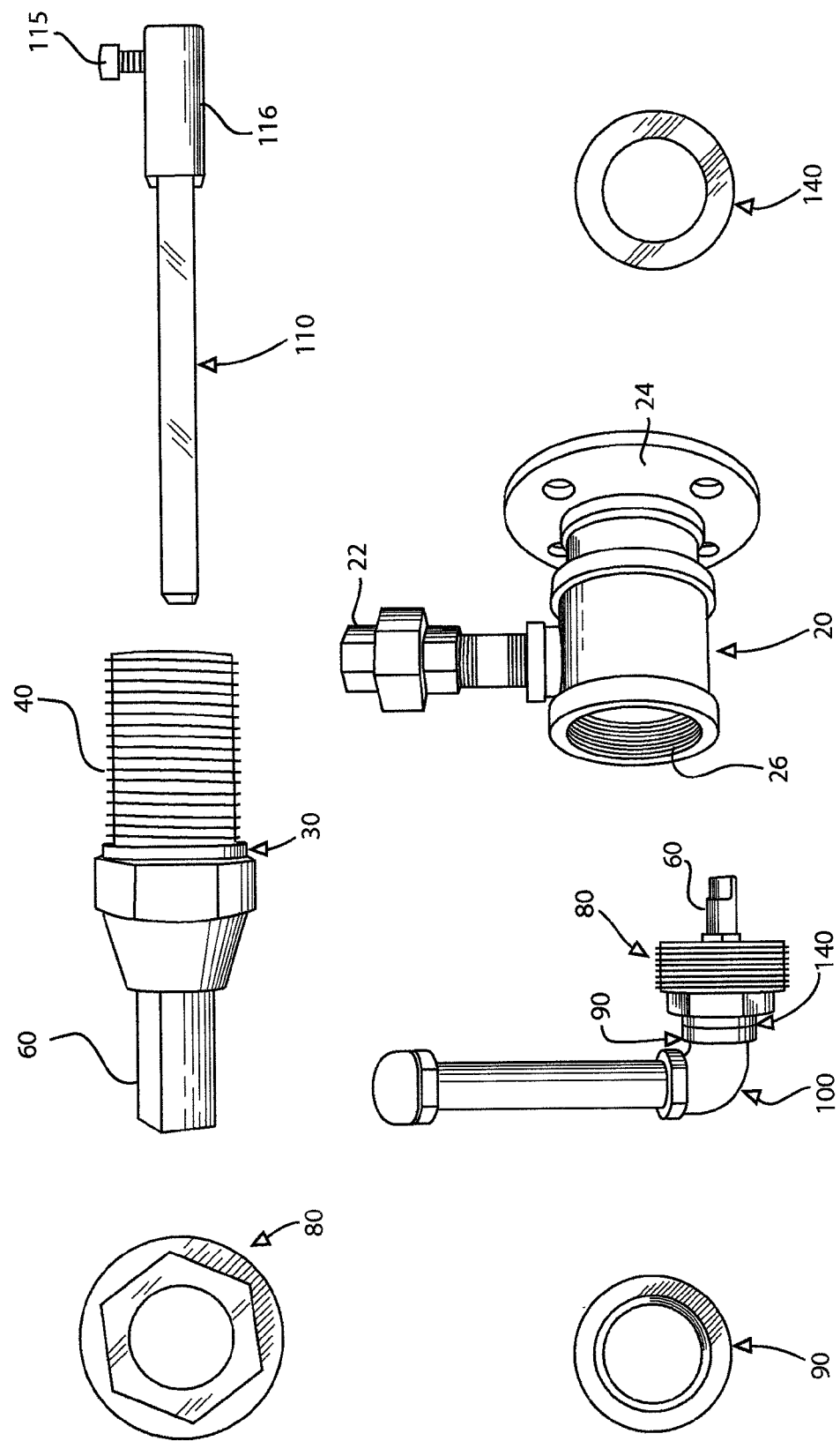
FIG. 1 illustrates perspective views of the components comprising the industrial plumbing fixture adaptor kit of the invention.

An industrial plumbing fixture adaptor kit is illustrated in FIGS. 1, 2, 3 and 4. Referring first to FIG. 1, the kit of the invention is comprised of a fixture trim 20, an adaptor 30, a bushing 80, a washer 90, a handle 100, an interchangeable adaptor element 110, and a vapor barrier gasket 140. It is to be understood that the kit of the invention is used for mounting the fixture trim 20 via handle 100 with bushing 80, adaptor 30 with washer 90 and optionally vapor barrier gasket 140, and interchangeable adaptor element 110 to plumbing hardware H, H' or H", such as a wall water valve. Examples of water valves which may be used in conjunction with the industrial plumbing fixture adaptor kit of the invention may be all brands, such as, for example, those manufactured by companies, such as, MOEN®, PRICE-PFISTER®, KOHLER®, and DELTA®. As is standard, the water valve has a stem and a water conduit for delivering water into a pipe (not shown) which is attached to the pipe connector 22 of fixture trim 20 (FIG. 1). It is to be understood that an adaptor 30 is illustrated in both FIG. 1 and FIG. 2; however adaptor 30 of FIG. 1 is structured slightly different from that of adaptor 30 of FIG. 2. Nevertheless the adaptors 30 of FIGS. 1 and 2 function in a similar manner, more of which is explained further herein below.

Figure 4:
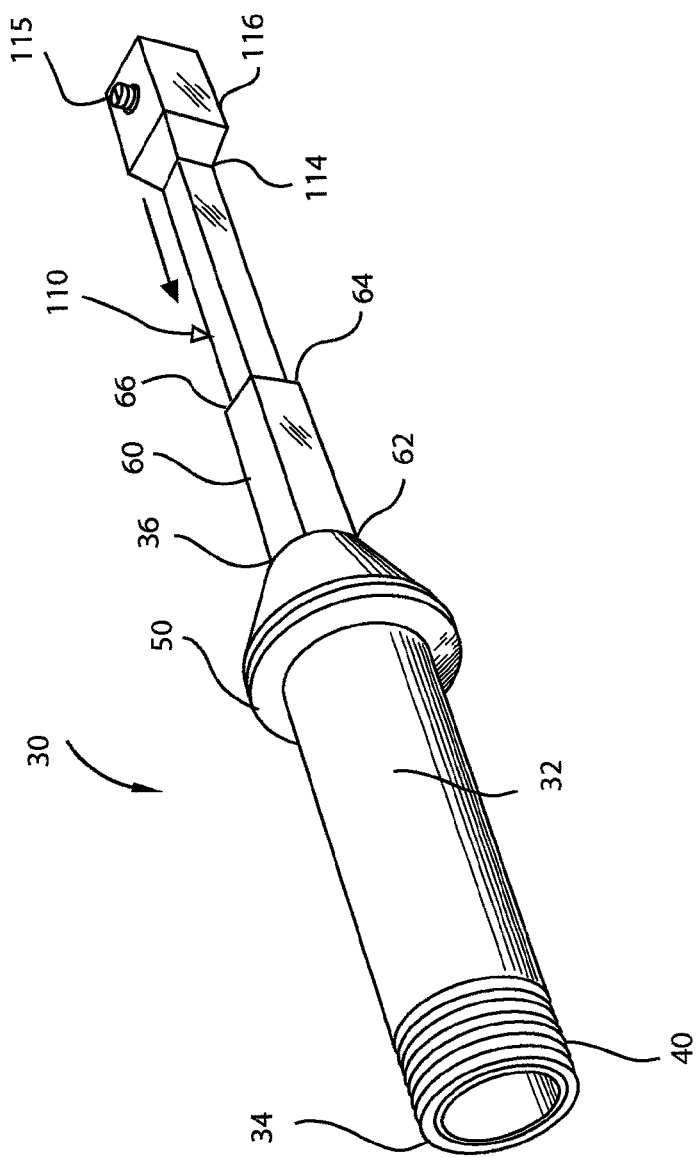
FIG. 4 is an enlarged, perspective view of the components of FIG. 2 wherein the interchangeable adaptor element is received into the adaptor of the kit of the invention.

With particular reference to FIGS. 2 and 4, adaptor 30 of the industrial plumbing fixture adaptor kit of the invention has an adaptor body 32 with a first end 34 and a second end 36. External threads 40 are provided on adaptor body 32 adjacent to the first end 34. A conical element 50 is mounted on adaptor body 32 adjacent to its second end 36 at a location spaced away from the first end 34 of adaptor body 32 of adaptor 30. A hollow tube 60, having a first end 62 and a second end 64, is fixedly attached to the second end 36 of adaptor 30 adjacent to conical element 50 of adaptor 30. Hollow tube 60 is preferably rectangular in cross-section, is linearly aligned with adaptor body 32 of adaptor 30, and has an opening 66 defined at its second end 64.

The industrial plumbing fixture adaptor kit of the invention further comprises bushing 80 which is mountable on the adaptor body 31 of adaptor 30 adjacent to conical element 50. As shown in FIG. 1, bushing 80 is generally in the form of a circular member with external threads. Even though not shown, handle 100 has internal threads which engage with threads 40 of adaptor 30. That is, adaptor 30 receives bushing 80 between conical element 50 and the external threads 40 of adaptor 30. A first isolater washer 90 is mounted on adaptor body 31 and against conical element between conical element 50 and first end 34 of adaptor 30. Bushing 80 allows handle 100 fixedly attached to adaptor 30 to rotate freely within fixture trim 20, as will become apparent to one skilled in the art from the teaching of this disclosure. In assembling some of the components of the kit of the invention and with reference to FIGS. 1, 2 and 3, the steps comprise: 1) mounting a first isolater washer 90 onto adaptor body 32 of adaptor 30 and against conical element 50 on the side of adaptor 30 with threads 40; 2) mounting bushing 80 on adaptor body 32 of adaptor 30 in a manner to receive handle 100; 3) mounting vapor barrier gasket 140 onto adaptor 30 and against bushing 80; 4) mounting second isolater washer 90 on adaptor 30 and against vapor barrier gasket 140; and 5) screwing handle 100 onto threads 40 of adaptor 30 such as to construct the assemblage of components as shown in a lower portion of FIG. 1. It can be appreciated that this assemblage of handle 100 within bushing 80 allows handle 100 along with adaptor 30 to rotate freely with fixture trim 20 with hollow tube 60 extending outwardly from bushing 80.

As stated herein above and with reference to FIG. 1, handle 100 has internal threads (not shown) for engaging with the external threads 40 of adaptor body 32 of adaptor 30 for controlling the wall water valve or plumbing hardware, such as that indicated by reference letters H, H', and H" in FIG. 2.

With particular reference to FIGS. 2 and 4, the interchangeable adaptor element 110 has a first end 112 which is received in opening 66 of hollow tube 60 of adaptor 30 and a second end 114 with a tip or head 116. Interchangeable adaptor element 110 has a rectangular cross-section corresponding to that of hollow tube 60 of adaptor 30. Head 116 is fixedly mounted to interchangeable adaptor element 110 and has an opening (not shown) for receiving and engaging the plumbing hardware H' of FIG. 2. As can be seen, both head 116 and plumbing hardware H' have a rectangular cross-section for engagement with each other for operation of the plumbing hardware H' or water valve, more about which is discussed further herein below. Still referring to FIG. 2, the attachment of head 116 to plumbing hardware H' is done via a set screw 115.

The kit of the invention further comprises a plurality of interchangeable adaptor elements 110, 110' each having a predetermined length. That is, as shown in FIG. 3, an interchangeable adaptor element 110' is illustrated with a length L and a head 116'. It is to be appreciated that several such interchangeable elements 110' will be provided in the kit of the invention with the length L of each interchangeable element 110' varying in accordance with its application and the depth of the wall in which the water valve is located. It is also to be appreciated that the configuration of each head 116' of each interchangeable adaptor element 110' will vary according to the configuration of the plumbing hardware or water valve. That is, head 116' may have an opening for connection with a valve stem or mixing valve having the configuration of the plumbing hardware H or H" of FIG. 2.

As stated in the preceding paragraph, while two interchangeable elements 110, 110' are shown in FIGS. 2 and 3, respectively, it is understood that the kit of the invention supplies several such interchangeable elements of varying lengths without departing from the scope of the disclosure or the claims associated therewith. Additionally, while heads 116, 116' are shown in FIGS. 2 and 3, respectively, it is to be understood that there may be provided several such different sized heads and/or heads with different opening having varying configurations without departing from the scope of the disclosure or the claims associated therewith. The shape of heads 116, 116' may be polygonal as shown in FIGS. 2 and 3, or they may be spherical or any other shape that coincides with the valve stem or mixing valve of the plumbing hardware in which the kit of the invention is used.

Referring again to FIG. 1, fixture trim element 20 is structured to be connected to handle 100. That is, fixture trim element 20 has internal threads 22 and the bushing 80 on handle 100 has corresponding external threads 102 for engagement with the internal threads 22 of fixture trim element 20 for connection of the handle 100 and adaptor 30 to fixture trim element 20.

It is to be appreciated that the adaptor 30 in FIG. 1 is slightly different in structure compared to adaptor 30 of FIGS. 2 and 4; however, either adaptor 30 of FIGS. 1, 2 and 3 may be provided and used in the invention. It is to be further appreciated that the upper portion 22 of fixture trim 20 of FIG. 1 is connected to a vertical pipe which, in turn, is connected to a horizontal pipe having an end with a shower head for delivering water downwardly into the shower stall or tub.

As discussed herein above, in operation of adaptor 30 with interchangeable adaptor element 110, the following steps will occur: i) head 116 of interchangeable adaptor element 110 is fixedly connected via set screw 115 to the stem of water valve or plumbing hardware H'; ii) fixture trim 20 via screws (not shown) is mounted against a wall surface in alignment with the water valve of plumbing hardware H' such that the rectangular member of interchangeable adaptor element 110 protrudes out of fixture trim 20; iii) the handle assembly 100 with bushing 80, vapor barrier gasket 140 and second washer 90 as shown in a lower portion of FIG. 1 is screwed via the threads of bushing 80 into the internal threads 26 of fixture trim 20 with the rectangular hollow tube 60 receiving the rectangular member of interchangeable adaptor element 110 thereby allowing the stem of the water valve (H') to turn in a direction to open the water valve via the handle assembly of FIG. 1 or to turn in an opposite direction to close the water valve via the handle assembly of FIG. 1.

A method of the invention involves the steps of: (a) providing an industrial plumbing fixture adaptor kit, comprising: (i) an adaptor having an adaptor body with a first end with external threads, a conical element on the adaptor body spaced away from the first end of the adaptor; and a hollow tube fixed attached to a second end of the adaptor, the hollow tube being linearly aligned with the adaptor body and having a second end spaced away from the first end, the hollow tube having an opening defined in the second end; the bushing for mounting on the adaptor body adjacent to the conical element, (ii) a bushing being locatable between the conical element and the external threads of the adaptor; (iii) a first washer for mounting on the adaptor body adjacent to the bushing between the bushing and the external threads of the adaptor; (iv) a handle having internal threads and adapted to be threadably attached to the external threads of the adaptor body; and (v) a plurality of interchangeable adaptor elements, each having a first end adapted to be received into the opening defined in the hollow tube of the adaptor, and each adaptor element having a head adapted to be connected to the plumbing hardware; (b) mounting the bushing onto the adaptor body and against the conical element of the adaptor; (c) mounting the first washer onto the adaptor body of the adaptor and against the bushing; (d) mounting the handle onto the adaptor of the adaptor for engagement with the bushing and the first washer and engaging the internal threads of the handle with the external threads of the adaptor to form a handle assembly and for protruding a portion of the hollow tube out of the bushing and away from the handle; (e) selecting an interchangeable adaptor element from the plurality of interchangeable adaptor elements; (f) attaching the selected interchangeable adaptor element to a plumbing hardware for extension of the interchangeable adaptor element outwardly; (g) attaching a fixture trim to a surface and around the interchangeable adaptor element; and (h) securing the handle assembly of step (d) to the fixture trim for engagement of the hollow tube of the adaptor with the interchangeable adaptor element for rotation of the handle and opening and closing of the plumbing hardware.

While the present invention has been described in connection with the preferred embodiments of the figures, it is to be understood that other similar embodiments may be used or modifications and additions may be made to the described embodiment for performing the same function of the present invention without deviating there from. Accordingly, it is intended by the appended claims to cover all such changes and modifications as come within the spirit and scope of the invention.

What is claimed is:

1. An industrial plumbing fixture adaptor kit for mounting a handle to a water valve, comprising:
   an adaptor comprising an adaptor body having a first end with external threads and a second end;
   a conical element fixedly mounted on the adaptor body at a location spaced away from the first end of the adaptor body;
   a hollow tube fixedly attached to the second end of the adaptor body, the hollow tube being linearly aligned with the adaptor body and having a second end which is spaced away from the first end, the hollow tube being rectangular in cross section and having an opening defined in the second end;
   a bushing mountable on the adaptor body adjacent to the conical element, the bushing being locatable between the conical element and the external threads of the adaptor, the bushing having external threads;

a first isolater washer mountable on the adaptor body adjacent to the bushing and between the bushing and the external threads of the adaptor;

a handle having internal threads and adapted to be threadably attached to the external threads of the adaptor; and an interchangeable adaptor element having a portion which is rectangular in cross-section and having a first end structured to be received within the defined opening of the hollow tube and having a head which is structured to be connected to the stem of a plumbing hardware.

2. The kit of claim 1, further comprising a plurality of interchangeable adaptor elements, each having a different length relative to each other.

3. The kit of claim 2, wherein each interchangeable adaptor element has a head for connection of the adaptor element to the plumbing hardware.

4. The kit of claim 2, wherein the configuration of the head of the interchangeable adaptor element differs relative to each other and corresponding to the configuration of the plumbing hardware.

5. The kit of claim 1, wherein the adaptor, the bushing, the first isolater washer and the handle form a handle assembly; and further comprising a fixture trim element having internal threads for engaging with the external threads of the bushing for attaching the handle assembly to the fixture trim element.

6. The kit of claim 1, further including a vapor barrier gasket adapted to be mounted on the adaptor body against the bushing and a second washer adapted to be mounted on the adaptor body and against the vapor barrier gasket.

7. The kit of claim 1, further including a set screw located adjacent to the second end of the interchangeable adaptor for connecting the interchangeable adaptor element to the plumbing hardware.

8. A method of attaching a handle to a plumbing fixture, the steps comprising:

(a) providing an industrial plumbing fixture adaptor kit, comprising: (i) an adaptor having an adaptor body with a first end with external threads, a conical element on the adaptor body spaced away from the first end of the adaptor; and a hollow tube fixed attached to a second end of the adaptor, the hollow tube being linearly aligned with the adaptor body and having a second end spaced away from the first end, the hollow tube having an opening defined in the second end; the bushing for mounting on the adaptor body adjacent to the conical element, (ii) a bushing being locatable between the conical element and the external threads of the adaptor; (iii) a first washer for mounting on the adaptor body adjacent to the bushing between the bushing and the external threads of the adaptor; (iv) a handle having internal threads and adapted to be threadably attached to the external threads of the adaptor body; and (v) a plurality of interchangeable adaptor elements, each having a first end adapted to be received into the opening defined in the hollow tube of the adaptor, and each adaptor element having a head adapted to be connected to the plumbing hardware;

(b) mounting the bushing onto the adaptor body and against the conical element of the adaptor;

(c) mounting the first washer onto the adaptor body of the adaptor and against the bushing;

(d) mounting the handle onto the adaptor of the adaptor for engagement with the bushing and the first washer and engaging the internal threads of the handle with the external threads of the adaptor to form a handle assembly and for protruding a portion of the hollow tube out of the bushing and away from the handle;

(e) selecting an interchangeable adaptor element from the plurality of interchangeable adaptor elements;

(f) attaching the selected interchangeable adaptor element to a plumbing hardware for extension of the interchangeable adaptor element outwardly;

(g) attaching a fixture trim to a surface and around the interchangeable adaptor element; and (h) securing the handle assembly of step (d) to the fixture trim for engagement of the hollow tube of the adaptor with the interchangeable adaptor element for rotation of the handle and opening and closing of the plumbing hardware.

* * * * *